(12) United States Patent
Andres

(10) Patent No.: US 10,266,034 B2
(45) Date of Patent: Apr. 23, 2019

(54) HEAT PUMP FOR SUPPLEMENTAL HEAT

(75) Inventor: Michael J. Andres, Roscoe, IL (US)

(73) Assignee: HAMILTON SUNDSTRAND CORPORATION, Windsor Locks, CT (US)

(*) Notice: Subject to any disclaimer, the term of this patent is extended or adjusted under 35 U.S.C. 154(b) by 1002 days.

(21) Appl. No.: 13/162,152

(22) Filed: Jun. 16, 2011

(65) Prior Publication Data
US 2012/0322354 A1 Dec. 20, 2012

(51) Int. Cl.
| | |
|---|---|
| *B60H 1/00* | (2006.01) |
| *B60H 1/14* | (2006.01) |
| *F25B 5/02* | (2006.01) |
| *B64D 13/06* | (2006.01) |
| *F25B 41/04* | (2006.01) |

(52) U.S. Cl.
CPC ......... *B60H 1/00907* (2013.01); *B60H 1/143* (2013.01); *B64D 13/06* (2013.01); *F25B 5/02* (2013.01); *F25B 41/04* (2013.01); *B60H 2001/00949* (2013.01); *B64D 2013/0614* (2013.01); *B64D 2013/0674* (2013.01)

(58) Field of Classification Search
CPC ... B60H 1/143; B60H 1/00907; F25D 11/022; B64D 2013/0618; B64D 2013/0614; B64D 13/06
USPC ............................................. 454/139, 74, 76
See application file for complete search history.

(56) References Cited

U.S. PATENT DOCUMENTS

| | | | |
|---|---|---|---|
| 3,623,546 A | 11/1971 | Banthin et al. | |
| 4,273,304 A | 6/1981 | Frosch et al. | |
| 4,445,342 A * | 5/1984 | Warner | 62/172 |
| 4,608,819 A | 9/1986 | Colman et al. | |
| 4,835,977 A | 6/1989 | Haglund et al. | |
| 4,967,565 A * | 11/1990 | Thomson | B64D 13/06 62/402 |
| 4,987,747 A * | 1/1991 | Nakamura | F24F 3/065 292/DIG. 38 |
| 5,142,879 A * | 9/1992 | Nakamura | F24F 3/065 62/160 |
| 5,145,124 A * | 9/1992 | Brunskill | B64D 13/06 454/74 |
| 5,722,229 A | 3/1998 | Provost | |
| 5,860,283 A * | 1/1999 | Coleman et al. | 62/87 |

(Continued)

FOREIGN PATENT DOCUMENTS

| | | | |
|---|---|---|---|
| EP | 1728657 A1 * | 12/2006 | ......... B60H 1/00907 |
| EP | 1878878 | 1/2008 | |
| GB | 2095757 | 10/1982 | |

*Primary Examiner* — Gregory L Huson
*Assistant Examiner* — Phillip Decker
(74) *Attorney, Agent, or Firm* — Carlson, Gaskey & Olds, P.C.

(57) ABSTRACT

A system for providing heating and cooling to an aircraft has a single compressor for compressing and heating a fluid, a first zone and a second zone. The first zone has a first expansion valve without a condenser and a first heat exchanger removing heat from or adding heat to the first zone. The compressed fluid passes through the first zone and the first expansion valve. The second zone requires cooling and has a second expansion valve without a condenser and a second heat exchanger for removing heat from the zone. The compressed fluid passes through the second expansion valve after going through the first expansion valve and before passing through the second heat exchanger.

14 Claims, 2 Drawing Sheets

(56) References Cited

U.S. PATENT DOCUMENTS

| | | | |
|---|---|---|---|
| 5,918,472 A * | 7/1999 | Jonqueres | 62/87 |
| 5,956,960 A * | 9/1999 | Niggeman | 62/172 |
| 6,182,435 B1 | 2/2001 | Niggemann et al. | |
| 6,347,528 B1 * | 2/2002 | Iritani et al. | 62/324.6 |
| 6,370,903 B1 * | 4/2002 | Wlech | B60H 1/143 |
| | | | 165/104.12 |
| 6,434,473 B1 | 8/2002 | Hattori | |
| 6,672,541 B2 * | 1/2004 | Fieldson et al. | 244/118.5 |
| 6,796,527 B1 * | 9/2004 | Munoz et al. | 244/118.5 |
| 6,817,576 B2 * | 11/2004 | Brady et al. | 244/118.5 |
| 6,880,351 B2 * | 4/2005 | Simadiris et al. | 62/185 |
| 6,939,392 B2 | 9/2005 | Huang et al. | |
| 7,231,778 B2 * | 6/2007 | Rigney et al. | 62/407 |
| 7,254,955 B2 * | 8/2007 | Otake | F25B 9/008 |
| | | | 62/238.7 |
| 7,331,196 B2 * | 2/2008 | Itsuki et al. | 62/510 |
| 7,631,510 B2 * | 12/2009 | Radermacher et al. | 62/196.2 |
| 7,716,934 B2 * | 5/2010 | Ebara | B60H 1/143 |
| | | | 62/113 |
| 2005/0016176 A1 | 1/2005 | Griffiths et al. | |
| 2006/0218952 A1 * | 10/2006 | Nagae et al. | 62/216 |
| 2007/0044493 A1 * | 3/2007 | Kearney | F25B 5/02 |
| | | | 62/259.2 |
| 2007/0151289 A1 * | 7/2007 | Youn et al. | 62/527 |
| 2007/0252039 A1 | 11/2007 | Wilmot, Jr. et al. | |
| 2008/0196442 A1 * | 8/2008 | Lu | 62/434 |
| 2009/0049857 A1 * | 2/2009 | Murakami | F25B 13/00 |
| | | | 62/324.6 |
| 2009/0260387 A1 * | 10/2009 | DeFrancesco | 62/401 |
| 2010/0089079 A1 * | 4/2010 | Bauer et al. | 62/115 |
| 2010/0242492 A1 | 9/2010 | Sloat et al. | |
| 2011/0005244 A1 * | 1/2011 | Finney et al. | 62/87 |
| 2011/0023447 A1 | 2/2011 | Veilleux | |
| 2011/0151762 A1 * | 6/2011 | Barkowsky | 454/76 |
| 2011/0209490 A1 * | 9/2011 | Mijanovic et al. | 62/190 |
| 2011/0219786 A1 * | 9/2011 | Andres | B64D 13/06 |
| | | | 62/7 |
| 2012/0291459 A1 * | 11/2012 | Millar et al. | 62/79 |
| 2014/0109603 A1 * | 4/2014 | Fernandes | B64D 13/06 |
| | | | 62/89 |

* cited by examiner

HEAT PUMP FOR SUPPLEMENTAL HEAT

BACKGROUND

The present invention relates to a thermal management system for use in an aircraft. More particularly, the present invention relates to a thermal management system configured to distribute heating or cooling between a plurality of heat pump units.

A typical commercial aircraft includes at least several nonintegrated cooling systems configured to provide temperature control to various regions of the aircraft. For example, an aircraft cooling system primarily provides heating and cooling for the aircraft cabin area. In addition, a galley chiller system is dedicated to refrigerating the food carts in the galleys located throughout the aircraft. Since each system has a significant weight and power requirement, the overall efficiency of the aircraft is affected by these nonintegrated systems.

Typically, aircraft cooling systems are standalone fluid cycle units. The fluid cycle units generally include a compressor pumping a refrigerant to a condenser, which rejects heat from the compressed refrigerant to the surrounding environment. The refrigerant from the condenser is regulated through an expansion valve to an evaporator where the refrigerant expands to cool the fluid. The refrigerant within the evaporator absorbs heat from the surrounding environment. After absorbing heat, the refrigerant flows from the evaporator to the compressor where the cycle repeats. Since each fluid cycle unit is dedicated to one region of the aircraft, a typical aircraft requires many of these units to meet its cooling demands.

In other types of aircraft, one or more fluid cycle units are positioned at one centralized location in the aircraft rather than having separate units dedicated to providing temperature control to one specific region. These fluid cycle units cool the refrigerant, pump the refrigerant to various locations throughout the aircraft that require cooling, and then direct all of the refrigerant back to the centralized fluid unit location. Thus, all the cooling of the refrigerant is performed at one location. Since the cooling is performed at one centralized location, the fluid cycle units are typically large, heavy, and utilize a significant amount of refrigerant, thus increasing the weight of the aircraft and decreasing aircraft efficiency.

SUMMARY

According to an embodiment disclosed herein, a system for providing heating and cooling to an aircraft has a single compressor for compressing and heating a fluid, a first zone and a second zone. The first zone has a first expansion valve without a condenser and a first heat exchanger removing heat from or adding heat to the first zone. The compressed fluid passes through the first zone and the first expansion valve. The second zone requires cooling and has a second expansion valve without a condenser and a second heat exchanger for removing heat from the zone. The compressed fluid passes through the second expansion valve after going through the first expansion valve and before passing through the second heat exchanger.

According to a further embodiment disclosed herein, a method for providing heating and cooling to an aircraft includes the steps of heating and compressing a fluid; passing the fluid through a first zone in the aircraft that requires heating or cooling, the first zone having a first expansion valve without a condenser and a first heat exchanger removing heat from or adding heat to the first zone, the compressed fluid passing through the first zone and the first expansion valve; and passing the fluid through a second zone in the aircraft that requires cooling, the second zone having an second expansion valve without a condenser and a second heat exchanger removing heat from the zone, the compressed fluid passing through the second expansion valve after going through the first expansion valve and before passing through the second heat exchanger.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figure 1:
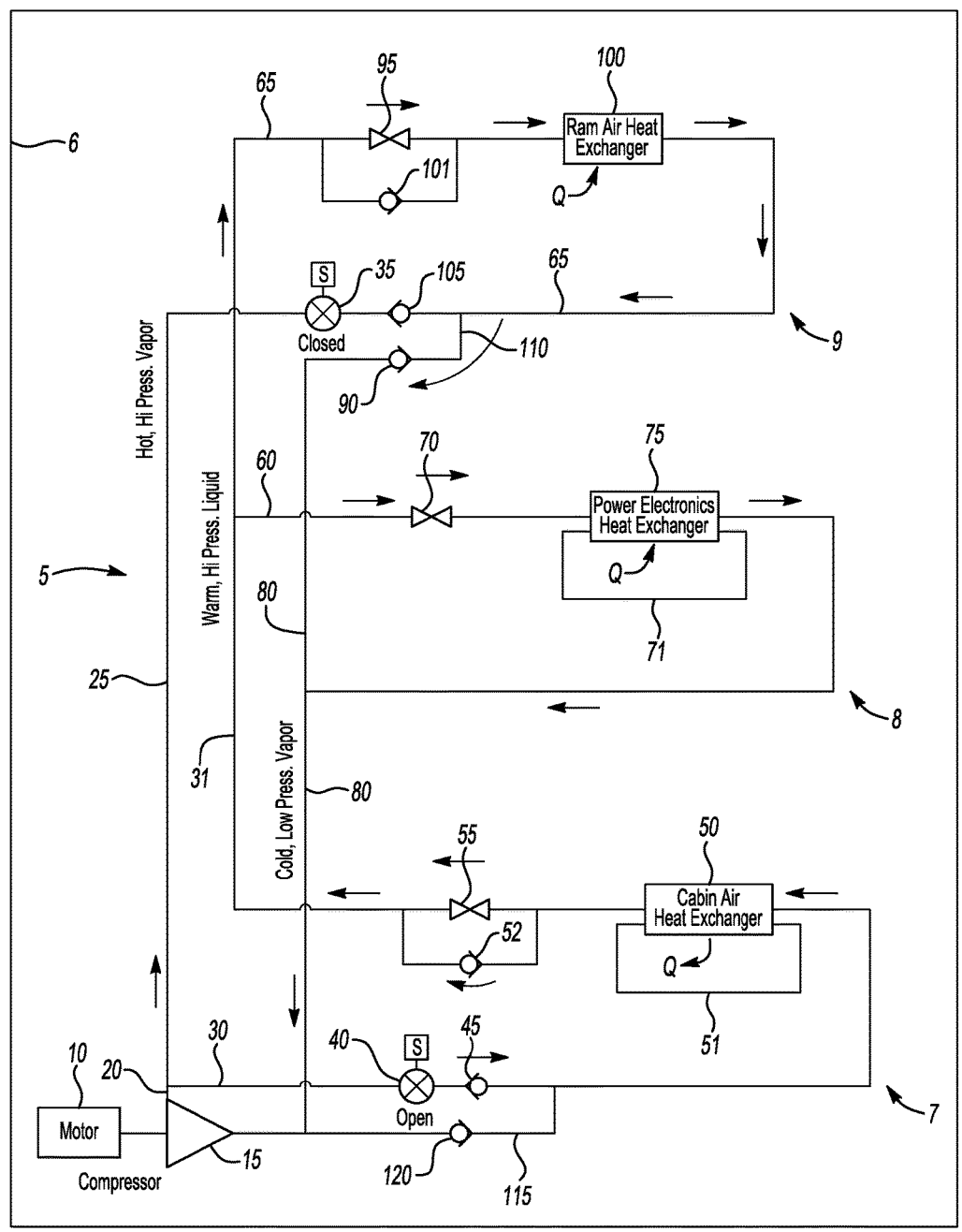
FIG. 1 is a schematic representation of an embodiment of an aircraft cooling and heating system in a first state.

Referring now to FIG. 1, an embodiment of a system 5 for an aircraft 6 is shown in a first state, in which a cabin 51 needs heating and power electronics 71 need cooling. The system 5 provides cooling and heating to a ram air loop 9, an electronics loop 8 and a cabin air loop 7. One of ordinary skill in the art will recognize from the teaching herein that other loops that may require heating and cooling within an aircraft are contemplated for use herein.

An electrically powered motor 10 drives compressor 15 which sends hot high pressurized fluid, which may be a refrigerating vapor, through line 20 to either lines 25 or 30. The motor 10 and the compressor may be placed thermally near a heat source 11, such as an APU, ambient air, an engine or the like to increase the efficiency of the system 5, which preheats the fluid.

In the instant case where cabin heat is required and power electronics are required to be cooled, first valve 35 is closed so that hot high pressurized fluid is directed through line 30 and second valve 40, which is open, through check valve 45 to a cabin heat exchanger 50 where heat Q is delivered to cabin 51. After heat Q is extracted from the cabin heat exchanger 50, the hot high pressure fluid is directed through a first expansion valve 55 where it cools to a warm high pressure fluid and then continues along line 31 until it is split to the electronics loop 8 via line 60 and the ram air loop 9 via line 65.

In the electronics loop 8, the warm high pressure fluid is directed along the line 60 through a second expansion valve 70 to cool the warm high pressure fluid. The now relatively cool fluid draws heat Q away from power electronics 71 via power electronics heat exchanger 75. The now relatively cool high pressure fluid is directed via line 80 back to the compressor 15 via line 85 through heat source 11. The high pressure fluid is prevented from extending up line 80 by check valve 90.

As stated above, the warm high pressure fluid also flows to the ram air loop 9 via line 65 an goes through a third expansion valve 95 to cool the warm high pressure fluid to a relatively cool high pressure fluid which passes through the ram air heat exchanger 100 extracting heat Q from the ram air. Ram air may be directed to overhead distribution nozzles (not shown) for use by passengers and may be used in various other zones of the aircraft (not shown) for heating or cooling.

The now relatively warmer cool high pressure fluid is passed through line 65 and is blocked from intermingling with the hot high pressure fluid by check valve 105. The relatively warmer cool high pressure fluid passes through check valve 90 via line 110 to pass through the waste line 80 to line 85 back to the compressor through heat source 11 which combine to create hot high pressure fluid sent through lines 25 and 30.

Figure 2:
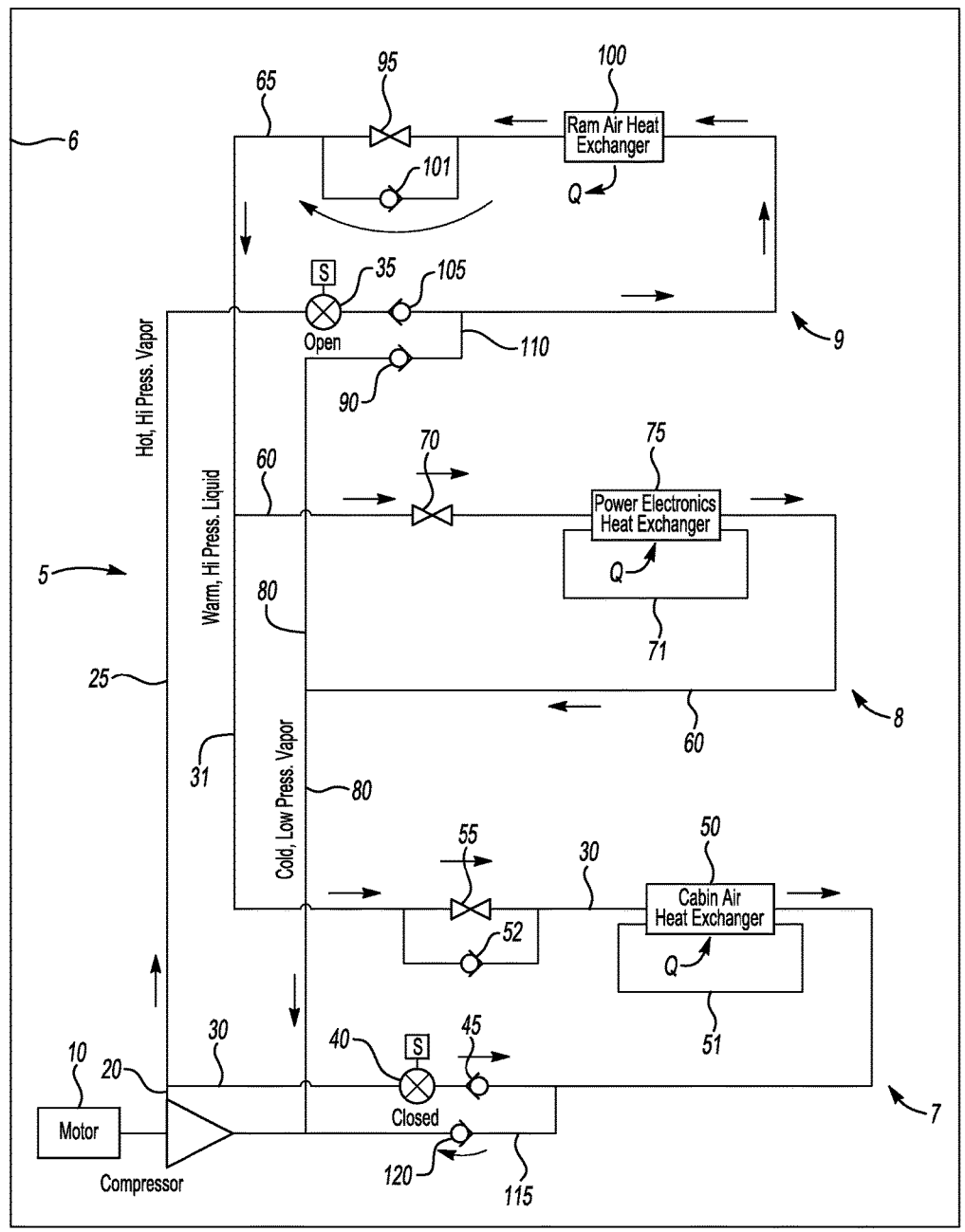
FIG. 2 is a schematic representation of an embodiment of an aircraft cooling and heating system as shown in FIG. 1 in a second state.

Referring to FIG. 2, the system 5 is shown in a second state in which the cabin 51 and power electronics 71 both now require cooling. In order to provide such cooling, first valve 35 is now open and second valve 40 is now closed. Such hot high pressure fluid cannot flow to the cabin air loop 7 because second valve 40 is closed.

Hot high pressure fluid is directed from the compressor via line 25 to the ram air loop 9. The hot high pressure fluid passes through first valve 35, check valve 105 and the ram air heat exchanger 100 where heat Q is extracted for use in the ram air other areas of the aircraft, including gaspers (not shown) in the cabin 51. The hot high pressure fluid is cools as it passes through the ram air heat exchanger and then is cooled again as it passes through third expansion valve 95. The now warm high pressurized fluid then passes through line 65 to line 31 where it is directed into the cabin air loop 7. The warm high pressurized fluid then passes through line 30 through the first expansion valve 55 where the fluid is transformed to be a cooled high pressure fluid. Such fluid passes through the cabin heat exchanger 50 where heat Q is extracted from the cabin. Such fluid is prevented from traveling further down line 30 by check valve 45 and is diverted through line 15 through check valve 120 back to the compressor 15.

After the hot high pressure fluid passes through valve 35 and check valve 105 a portion of such air is directed via line 110, check valve 90, line 80, and line 85 through heat source 11 to the compressor 15. The check valve 90 acts as a pressure relief valve to protect the system 5 downstream of the check valve 105 from overpressure.

After passing through the third expansion valve 95, the warm high pressure fluid also passes through line 65 to line 60, via line 31, and second expansion valve 70 which reduces the temperature of the warm high pressure fluid and through the electronics heat exchanger 75 where heat Q is extracted from the electronics 71. The now warmed cold low pressure fluid is directed through line 60, line 80, and line 85, through heat source 11 back to the compressor 15.

By using the fluid/vapor compression provided by the motor/compressor 10, 15 can be used to supplement cabin 51 or other equipment heating during cold weather and during flight. No electrical resistance heating is required to heat the cabin 51 thereby. The system provides more thermal power than it uses electrical power thereby increasing the efficiency of the aircraft 7. Additionally, the system can use the heat generated by the power electronics in both the first state and the second state and by the cabin in the second state to increase the efficiency of the system.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A system for providing heating and cooling to an aircraft comprises:
   a single compressor for compressing and heating a fluid, wherein the fluid is a refrigerant and the system is a refrigeration cycle;
   a first zone in said aircraft that requires heating or cooling, said first zone having a first expansion valve without a condenser and a first heat exchanger removing heat from or adding heat to said first zone, said compressed fluid passing through said first zone and said first expansion valve;
   a second zone in said aircraft that requires cooling, said second zone having a second expansion valve without a condenser and a second heat exchanger for removing heat from said second zone, said compressed fluid passing through said second expansion valve after going through said first expansion valve and before passing through said second heat exchanger; and
   a first valve that is open for directing hot compressed fluid from said compressor through said first heat exchanger in said first zone if said first zone needs heating.

2. The system of claim 1 wherein said fluid is a vapor.

3. The system of claim 1 further comprising a third zone in said aircraft that requires heating or cooling, said third zone having a third expansion valve without a condenser and a third heat exchanger for removing heat from or adding heat to said third zone, said compressed fluid passing through said third zone and said third expansion valve.

4. The system of claim 3 wherein said third zone requires cooling if said first zone requires heating and said third zone requires heating if said first zone requires cooling.

5. The system of claim 4 wherein said third zone conditions ram air in said aircraft.

6. The system of claim 5 wherein said first zone is a cabin and said second zone is electronics.

7. The system of claim 3, wherein the second zone is fluidly in parallel with the third zone.

8. The system of claim 1 wherein said first zone is a cabin.

9. The system of claim 1 wherein said second zone is electronics.

10. The system of claim 1 further comprising a second valve for directing hot compressed fluid from said compressor to said second zone if said first zone needs cooling and wherein said first valve is closed.

11. The system of claim 1 further comprising:
    a fluid preheater disposed upstream of said compressor.

12. A system for providing heating and cooling to an aircraft comprises:
    a single compressor for compressing and heating a fluid, wherein said fluid is a refrigerant and said system is a refrigeration cycle;
    a first zone in said aircraft requiring heating, said first zone having a first expansion valve without a condenser and a first heat exchanger in communication with said first zone, said fluid passing through said first zone and said first expansion valve;

a second zone in said aircraft requiring cooling, said second zone having a second expansion valve without a condenser and a second heat exchanger for removing heat from said second zone, said fluid passing through said second expansion valve after going through said first expansion valve and before passing through said second heat exchanger, and a first valve in communication with the first heat exchanger configured to direct the fluid through the first heat exchanger in a first direction when in a first state and in a second direction when in a second state.

13. The system of claim 12, comprising a third zone in said aircraft that requires cooling, said third zone having a third expansion valve without a condenser and a third heat exchanger in communication with said third zone, said compressed fluid passing through said third zone and said third expansion valve, wherein the second zone is fluidly in parallel with the third zone.

14. A system for providing heating and cooling to an aircraft comprises:

a single compressor for compressing and heating a fluid, wherein the fluid is a refrigerant and the system is a refrigeration cycle;

a first zone in said aircraft that requires cooling, said first zone having a first expansion valve and a first heat exchanger in communication with said first zone, said compressed fluid passing through said first zone and said first expansion valve;

a second zone in said aircraft that requires cooling, said second zone having a second expansion valve without a condenser and a second heat exchanger for removing heat from said second zone, said compressed fluid passing through said second expansion valve after going through said first expansion valve and before passing through said second heat exchanger;

a third zone in said aircraft that requires heating, said third zone having a third expansion valve without a condenser and a third heat exchanger in communication with said third zone, said compressed fluid passing through said third zone and said third expansion valve, wherein said second zone is fluidly in parallel with said third zone; and a first valve in communication with said first zone and a second valve in communication with said third zone, wherein when said first valve is open and said second valve is closed the system is configured to direct said fluid through said first heat exchanger and said third heat exchanger in a first direction and when said first valve is closed and said second valve is open said system is configured to direct said fluid through said first heat exchanger and said third heat exchanger in a second opposite direction.

* * * * *